Aug. 18, 1936. E. A. ZEVELY ET AL 2,051,669
LIQUID LEVEL GAUGE
Filed Oct. 24, 1935 2 Sheets-Sheet 1
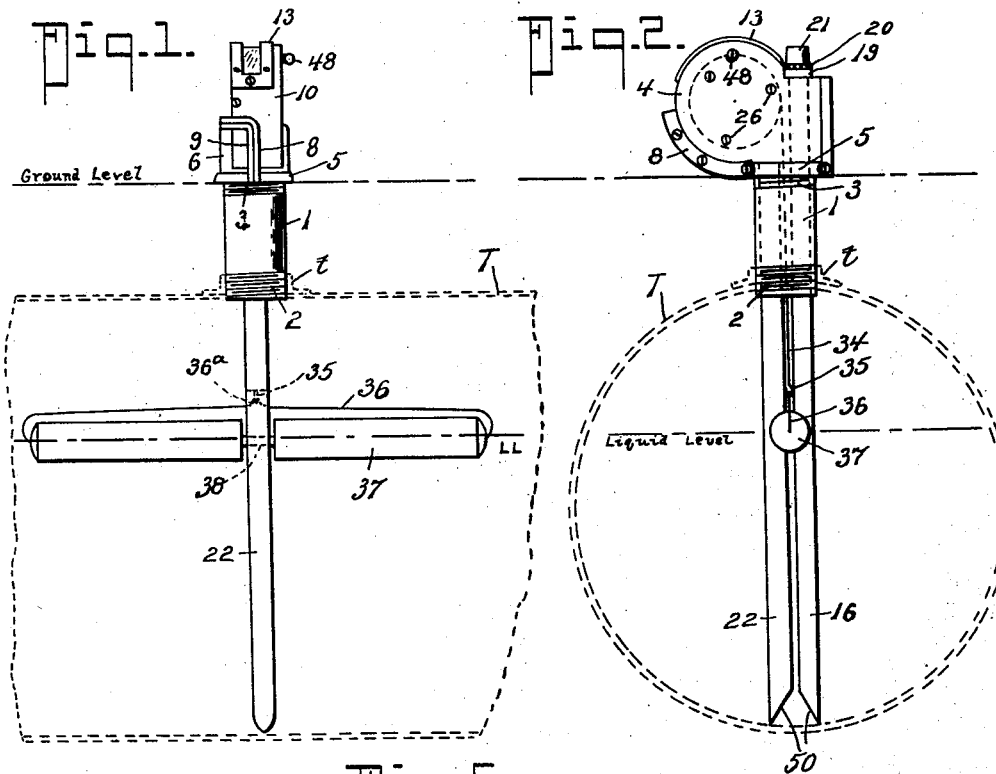
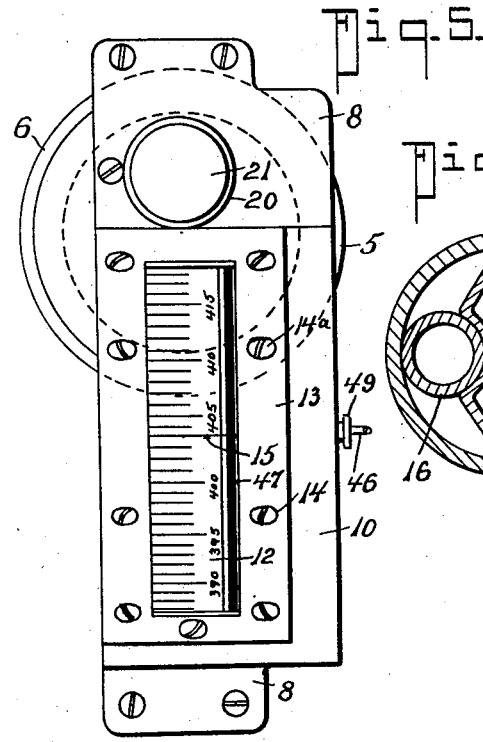
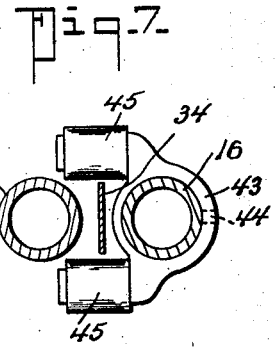
Inventor
EDWARD A. ZEVELY
ANTHONY B. McCABE
By Albert E Dieterich
Attorney Aug. 18, 1936.  E. A. ZEVELY ET AL  2,051,669
LIQUID LEVEL GAUGE
Filed Oct. 24, 1935  2 Sheets-Sheet 2
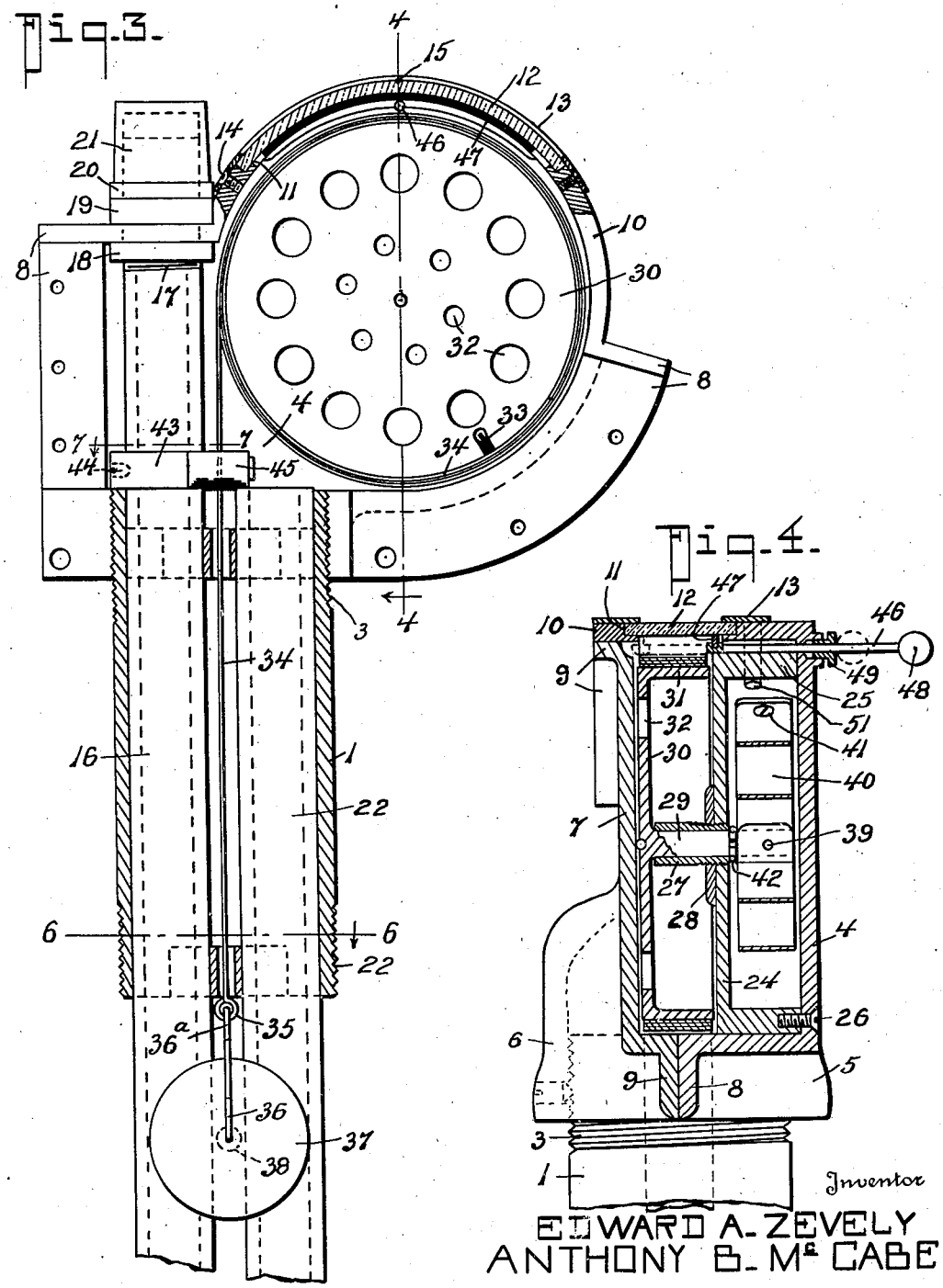
Inventor
EDWARD A. ZEVELY
ANTHONY B. McCABE
By Albert E. Dieterich
Attorney Patented Aug. 18, 1936

2,051,669

UNITED STATES PATENT OFFICE 2,051,669

LIQUID LEVEL GAUGE

Edward A. Zevely and Anthony B. McCabe,
Jamaica, N. Y.

Application October 24, 1935, Serial No. 46,572

12 Claims. (Cl. 73—82)

Our invention relates to certain new and useful improvements in gauges for indicating the quantity of liquid in a tank or reservoir, especially those for storing gasoline, etc.

Among the objects of the invention are: to provide a gauge which is practical, i. e., well designed and built, and of such construction that it will accurately indicate the level of the liquid in a clear and easily readable manner; to provide a gauge of the float-operated type which may be applied to the filling neck of the tank; to provide a gauge which may be applied to such neck in a manner so that access to the indicating mechanism may be obtained, for replacements or repairs when necessary, without removing the entire case from the filling neck; to provide a gauge with a float guide which is secured rigidly within the filling neck; to provide means for preventing the case from swiveling on the filling neck and thereby keeping the indicating mechanism within the case always properly lined up with the tape portion that extends into the tank and carries the float; to provide a tubular float which extends horizontally in the direction of the length of the tank and is held with its axis substantially parallel with that of the tank by the float guide; to provide a gauge whose float guide not only performs the function of a guide for the float but also serves, in part, as the swivel-preventing means and as a means through which, without removal of the case, may be used as a means through which water of condensation may be pumped out of the tank; to provide a gauge with a float of such form and construction that it may be placed in the tank through the filling opening; to provide an indicating mechanism which includes a calibrated tape connected to the float and extending through the float guide into the case where it is wound on a rotary, spring-balanced drum, the case having a suitable transparent window through which the tape is readable; to provide means for wiping the inside of the window to remove fog or condensed moisture therefrom; to provide a spring housing and means whereby it may be filled with glycerine, alcohol, or any suitable "antifreeze" liquid; to provide a float guide securing means of a very simple structure which will hold the parts in place in the filling neck by retaining friction.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 1 is a front elevation of our invention in use, the tank being indicated in dotted line.

Figure 2 is a side elevation thereof.

Figure 3 is an enlarged central vertical section of the gauge, the lower parts of the float guide being broken away, a part of the case being broken away, and a part removed.

Figure 4 is a vertical section on the line 4—4 of Figure 3.

Figure 5 is a top plan view of the gauge.

Figures 6 and 7 are detail cross sections on the lines 6—6 and 7—7 respectively of Figure 3.

In the drawings, in which like letters and numerals of reference indicate like parts in all the figures, T represents the tank and $t$ the threaded flange over the filling opening into which the neck 1 is screwed. The neck 1 is threaded at its ends, as at 2 and 3, so as to fit the flange $t$ and receive the split socket 5 and 6 of the case 4 and 7.

The case is made in two parts flanged at 8 and 9 and secured together by suitable screws, as indicated. The case is not placed on the pipe by screwing it on although the case and pipe are threaded.

The portion of the case which houses the spring box and tape drum includes an arcuate portion 10 having an opening 11 to receive the glass or other transparency 12, the latter being held in place by a slotted plate 13 and screws 14—14a. The parts 11—14a comprise the window structure of the case.

An indicator 15 is provided, which may consist of a line, scratched, etched or painted on the glass 12, or it may be a fine wire extended rigidly across the glass.

The float guide comprises two rod-like members 16 and 22, secured in the neck 1 by metal braces 23 of hard (preferably slightly resilient) metal.

The member 16 is preferably a pipe with a relatively thick wall, which pipe extends upwardly through the case and a part of the flange 8, being suitably packed as by means of jam nuts 18 and 20 and a gasket 19 of suitable material, as cork for example, on the threaded end 17 of the pipe 16. A cap 21 closes the upper end of the pipe 16.

The member 22 may also be a pipe if desired.

The braces 23 have a driving fit in the neck and hold the pipes 16 and 22 rigidly in place with retaining friction.

The spring box 24 is secured to the side wall 4 of the case by suitable screws 26. It is bored and tapped to receive the bearing 27, the latter being locked by the disc 28 as a jam nut.

The tape drum 30 has its stub shaft 29 journaled in the bearing 27, it being held in place by a springy clip 42 located in a groove in the shaft. The counter-balancing spring 40 has one end secured at 39 to the shaft 29 and has its other end secured at 41 to the peripheral portion 25 of the spring box 24.

The tape drum is lightened by holes 32 and has is peripheral portion 31 slit, as at 33, to receive an end of the measuring tape 34 wound thereon.

The tape 34 extends down between the pipes 16 and 22 through the braces 23, and has an eye 35 to receive the rod-like wire 36 whose ends are curved over and secured axially to the ends of the float 37—38, the wire 36 having a loop 36ᵃ to receive the eye 35 when the parts are operatively assembled.

The float consists of two elongated drums 37 on a rod 38 which extends between the guide pipes 16 and 22, the adjacent ends of the float drums 37 lying in proximity to such pipes.

In order to steady the tape where it enters the case from the tank and prevent its twisting or becoming laterally out of alignment with the tape drum 30, we may provide guide rollers 45 carried by a support 43 secured to one of the pipes (say 16) by a set screw 44, or in any other suitable way.

Since the window transparency 12 sometimes fogs from moisture condensed on its inner face, we provide means to wipe the same so that the visibility of the indicating tape 34 may not be impaired. The window may be wiped by providing a squeegee 47 carried by a rod 46 passing through a stuffing box 49, or its equivalent, and carrying a suitable handle 48 by which the rod 46 may be moved out and in to carry the squeegee 47 over the surface of the glass. Normally the rod preferably remains pushed in, but when a reading is desired it may be pulled out to clear the marker 15 (or the rod 46 itself may be used as the marker).

The lower ends of the pipes 16 and 22 are beveled off as at 50 to form an inverted V entrance to the guideway between them, so that when the device is being placed in the tank the guides 16—22 can be readily slipped over the rod 38.

In order that the spring box 24 may be filled with suitable antifreeze liquid, a hole 51 is provided which may line up with one of the holes for a screw, say 14ᵃ, which holds the plate 13 in place. By removing screw 14ᵃ the opening 51 is exposed for filling purposes.

The manner in which our invention operates will be clear from a mere inspection of the drawings.

In placing the device in position on and in the tank the parts secured to the neck are first assembled; then the tape and float are connected. The float is inserted through the tank opening endwise (after being pulled to and beyond the ends of pipes 16 and 22). After inserting the float and tape through pipe 1 the guide pipes 16 and 22 are put in. After securing guide pipes 16 and 22 in pipe 1 the side 4 of the case containing the mechanism is fitted over guide pipe 16. The threaded bottom portion of the case engages the threads on pipe 1. Then the lock nuts 18 and 20 are tightened. The tape is next fastened to take-up drum and then the other side 7 of the case is put on and secured with screws. The pipe 16 prevents the case swivelling on the neck 1 when once the parts are assembled.

In order to remove the gauge entirely from the tank the case sections 4 and 7 are separated by removing the screws, the lock nut 20 and washer 19 are removed together with cap 21; tape is unfastened from drum and case removed from pipe 1. Pipes 16 and 20 together with the friction braces 23 are then removed (the braces being pulled with any suitable tool). After the pipes 16 and 22 and braces 23 have been removed a wire with a hook at its end is inserted through pipe 1 and is brought into engagement with the rod wire 35 and the float is up-ended. After being up-ended the float is fished through the filling opening of the tank. It should be understood that it is not necessary to remove the pipe 1. However, if desired the pipes 16 and 20 with the braces 23 may be allowed to remain in the pipe 1 and the pipe 1 unscrewed from the tank, in order to remove pipes 16 and 22, if such be found more convenient.

Obviously in practice the length of the float structure should not equal the internal diameter of the tank. In the showing of the float structure (Figures 1 and 2) the same is shown considerably amplified as regards the tank structure.

When it is desired to remove water of condensation that may be accumulated at the bottom of the tank T, cap 21 is removed and a suction pump is connected to pipe 16.

Pipe 16 may also be used for filling purposes if desired.

From the foregoing description taken in connection with the accompanying drawings it is thought that the construction, operation and advantages of the invention will be readily understood by those skilled in the art.

What we claim is:

1. In a liquid level gauge for tanks having an opening, a pipe secured to the tank over the opening and extending upwardly, a split case mounted on and over the upper end of said pipe, a float guide mounted in said pipe and extending into the tank and engaging said case to hold it against swivelling on said pipe, a measuring tape, a tape drum mounted in said case to which one end of said tape is anchored, a counter-balancing spring device for cooperation with said drum also mounted in said case, a float comprising a pair of drum-like bodies connected by a bar, said float guide cooperating with said bar and the adjacent ends of said float bodies to guide the float, the other end of said tape being connected with said float, said case having a window through which said tape may be read.

2. In a liquid level gauge for tanks having an opening, a pipe secured to the tank over the opening and extending upwardly, a split case mounted on and over the upper end of said pipe, a float guide mounted in said pipe and extending into the tank and engaging said case to hold it against swivelling on said pipe, a measuring tape, a tape drum mounted in said case to which one end of said tape is anchored, a counter-balancing spring device for cooperation with said drum also mounted in said case, a float comprising a pair of drum-like bodies connected by a bar, said float guide cooperating with said bar and the adjacent ends of said float bodies to guide the float, the other end of said tape being connected with said float, said case having a window through which said tape may be read, the diameter of said float drums being such that said float may be passed through said pipe endwise in inserting or removing the float with respect to the tank.

3. In a liquid level gauge for liquid storage tanks, a supporting pipe removably connectable to the tank, a float guide carried by said pipe, a case also carried by said pipe, registering mechanism in said case which mechanism includes a calibrated tape that extends through said pipe, and a float operatively associated with said float guide to which float said tape is connected, said case having a window through which said tape may be read, said float guide comprising two parallel rod-like elements extending into the tank and into said pipe, and said float comprising two buoyant bodies connected end to end by a rod-like member passed between said two parallel elements with one buoyant body at each side of the float guide.

4. In a liquid level gauge for liquid storage tanks, a supporting pipe removably connectable to the tank, a float guide carried by said pipe, a case also carried by said pipe, registering mechanism in said case which mechanism includes a calibrated tape that extends through said pipe, a float operatively associated with said float guide to which float said tape is connected, said case having a window through which said tape may be read, said float guide comprising two parallel rod-like elements extending into the tank, and said float comprising two buoyant bodies connected end to end by a rod-like member passed between said two parallel elements with one buoyant body at each side of the float guide, said tape passing between said rod-like elements, and guide rollers carried by at least one of said rod-like elements to center the tape as it passes into the case from the tank.

5. In a liquid level gauge for liquid storage tanks, a supporting pipe removably connectable to the tank, a float guide carried by said pipe, a case also carried by said pipe, registering mechanism in said case which mechanism includes a calibrated tape that extends through said pipe, a float operatively associated with said float guide to which float said tape is connected, said case having a window through which said tape may be read, said float guide comprising a pair of parallel rod-like elements, and braces in said pipe for holding said rod-like elements in the pipe by retaining friction.

6. In a liquid level gauge for liquid storage tanks, a supporting pipe removably connectable to the tank, a float guide carried by said pipe, a case also carried by said pipe, registering mechanism in said case which mechanism includes a calibrated tape that extends through said pipe, a float operatively associated with said float guide to which float said tape is connected, said case having a window through which said tape may be read, said float guide comprising a pair of parallel rod-like elements, and braces in said pipe for holding said rod-like elements in the pipe by retaining friction, said case being threaded onto said pipe and one of said rod-like elements being also secured to said case to prevent swiveling of the case on said pipe.

7. In a liquid level gauge for liquid storage tanks, a supporting pipe removably connectable to the tank, a float guide carried by said pipe, a case also carried by said pipe, registering mechanism in said case which mechanism includes a calibrated tape that extends through said pipe, a float operatively associated with said float guide to which float said tape is connected, said case having a window through which said tape may be read, said float guide comprising a pair of parallel rod-like elements, braces in said pipe for holding said rod-like elements in the pipe by retaining friction, said case being threaded onto said pipe and one of said rod-like elements being also secured to said case to prevent swiveling of the case on said pipe, said one rod-like element comprising a tube, said tube extending through said case, and a cap for the outer end of said tube, said tube at its inner end communicating with the tank at its bottom for purposes described.

8. In a liquid level gauge for tanks having an opening provided with a flange, a pipe screwed into said flange, a case screwed onto said pipe, a float guide carried by and rigidly secured within said pipe and extending into the tank, a registering mechanism in the case including an indicating tape, a float guided within the tank by said float guide, said tape being connected to said float, said registering mechanism including a counter-balancing spring, a box therefor, and a tape take-up drum rotatably journaled in a bearing carried by said box.

9. In a liquid level gauge for tanks having an opening provided with a flange, a pipe screwed into said flange, a case screwed onto said pipe, a float guide carried by and rigidly secured within said pipe and extending into the tank, a registering mechanism in the case including an indicating tape, a float guided within the tank by said float guide, said tape being connected to said float, said registering mechanism including a counter-balancing spring, a box therefor, a tape take-up drum rotatably journaled in a bearing carried by said box, and means through which said box may be filled with an antifreeze liquid.

10. In a liquid level gauge for tanks having an opening provided with a flange, a pipe screwed into said flange, a case screwed onto said pipe, a float guide carried by and rigidly secured within said pipe and extending into the tank, a registering mechanism in the case including an indicating tape, a float guided within the tank by said float guide, said tape being connected to said float, said registering mechanism including a counter-balancing spring, a box therefor, a tape take-up drum rotatably journaled in a bearing carried by said box, said case having a window through which said tape may be read, and a squeegee wiper device mounted within the case to lie between said drum and window for wiping the window, said wiper device having an operating handle located outside the case.

11. In a liquid level gauge for liquid storage tanks, a supporting pipe, a float guide comprising two parallel rod-like guide members, one of which is tubular, said guide members projecting into said pipe, means in said pipe for holding said guide members in place therein, said guide members extending below said pipe in spaced relation to one another, a float comprising two elongated bodies connected by a rod end to end, the rod passing between said guide members, a casing secured to and over the upper end of said pipe, a registering mechanism in said casing, which registering mechanism includes a calibrated tape passing between said guide members and connected with said float, the tubular guide member extending upwardly through said casing and having a removable cap over its upper end for the purposes described.

12. In a liquid level gauge for liquid storage tanks, a supporting pipe, a float guide comprising two parallel rod-like guide members, one of which is tubular, said guide members projecting into said pipe, means in said pipe for holding said guide members in place therein, said guide members extending below said pipe in spaced relation to one another, a float comprising two elongated bodies connected by a rod end to end, the rod passing between said guide members, a casing secured to and over the upper end of said pipe, a registering mechanism in said casing, which registering mechanism includes a calibrated tape passing between said guide members and connected with said float, the tubular guide member extending upwardly through said casing and having a removable cap over its upper end, said casing having a threaded engagement with said pipe, and said tubular guide member and said casing being secured together whereby said tubular guide member will prevent swivelling of said casing on said pipe.

EDWARD A. ZEVELY.
ANTHONY B. McCABE.